United States Patent
Neuhaeuser

(10) Patent No.: US 10,779,138 B2
(45) Date of Patent: Sep. 15, 2020

(54) TRANSMISSION OF A MESSAGE TO BE DISPLAYED TO A DISPLAY DEVICE OF A MOTOR VEHICLE

(71) Applicant: Bayerische Motoren Werke Aktiengesellschaft, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/045,829

(22) Filed: Jul. 26, 2018

(65) Prior Publication Data

US 2018/0338230 A1    Nov. 22, 2018

Related U.S. Application Data

(63) Continuation of application No. PCT/EP2017/051073, filed on Jan. 19, 2017.

(30) Foreign Application Priority Data

Jan. 27, 2016 (DE) .................. 10 2016 201 162

(51) Int. Cl.
*H04W 4/44* (2018.01)
*H04W 4/50* (2018.01)
(Continued)

(52) U.S. Cl.
CPC ............... *H04W 4/44* (2018.02); *H04W 4/48* (2018.02); *H04W 4/50* (2018.02); *H04W 8/26* (2013.01); *H04W 76/10* (2018.02); *H04W 4/12* (2013.01)

(58) Field of Classification Search
CPC ..... H04W 4/12; H04W 4/14; H04W 4/40–48; H04W 4/50; H04W 76/10
See application file for complete search history.

(56) References Cited

U.S. PATENT DOCUMENTS

2006/0152387 A1    7/2006  Ringel et al.
2008/0268866 A1*  10/2008  Sukkarie ............... G07C 5/008
                                                                    455/456.1
(Continued)

FOREIGN PATENT DOCUMENTS

DE      100 33 808 A1    1/2002
DE      102 58 302 A1    7/2004
(Continued)

OTHER PUBLICATIONS

International Search Report (PCT/ISA/210) issued in PCT Application No. PCT/EP2017/051073 dated Mar. 31, 2017 with English translation (five pages).

(Continued)

*Primary Examiner* — Allahyar Kasraian
(74) *Attorney, Agent, or Firm* — Crowell & Moirng LLP

(57) ABSTRACT

A method for transmitting a message to be displayed to a display device of a motor vehicle includes the steps of: is selecting at least one motor vehicle to which a message is to be transmitted from a motor vehicle database on a central computer using predetermined selection criteria and ascertaining a mobile radio system mobile radio identification number associated with the respective motor vehicle; activating an inactive subscriber identity module of the mobile radio system using the mobile radio identification number, wherein the subscriber identity module is connected to a radio device of the at least one selected motor vehicle; setting up a data link from the central computer to the radio device of the at least one selected motor vehicle via the mobile radio system; transmitting the message to be displayed from the central computer via the data link to a processor apparatus, connected to the radio device, of the respective ascertained motor vehicle; processing the message further by way of the processor apparatus and display- (Continued)

ing the message on a display device connected to the processor apparatus.

13 Claims, 2 Drawing Sheets

(51) Int. Cl.
*H04W 4/48* (2018.01)
*H04W 76/10* (2018.01)
*H04W 8/26* (2009.01)
*H04W 4/12* (2009.01)

(56) References Cited

U.S. PATENT DOCUMENTS

| | | |
|---|---|---|
| 2009/0047929 A1 | 2/2009 | Chesnutt et al. |
| 2011/0054767 A1* | 3/2011 | Schafer ................ G08G 1/0112 701/119 |
| 2012/0208597 A1* | 8/2012 | Billman ................ H04W 12/02 455/558 |
| 2012/0222120 A1* | 8/2012 | Rim ...................... G06F 21/566 726/24 |
| 2013/0046432 A1* | 2/2013 | Edwards ............. G01C 21/3605 701/29.4 |
| 2014/0109075 A1* | 4/2014 | Hoffman ................ G06F 8/65 717/169 |
| 2014/0358749 A1* | 12/2014 | Williams ............... G06Q 30/04 705/34 |
| 2015/0081858 A1 | 3/2015 | Gel |
| 2018/0144163 A1* | 5/2018 | Wennemer ....... G06K 19/06206 |

FOREIGN PATENT DOCUMENTS

| | | |
|---|---|---|
| DE | 10 2008 037 130 A1 | 4/2009 |
| DE | 10 2014 001 487 A1 | 8/2014 |
| EP | 1 337 120 A2 | 8/2003 |
| WO | WO 2014/158766 A1 | 10/2014 |

OTHER PUBLICATIONS

German-language Written Opinion (PCT/ISA/237) issued in PCT Application No. PCT/EP2017/051073 dated Mar. 31, 2017 (six pages).

German-language Search Report issued in counterpart German Application No. 10 2016 201 162.6 dated Sep. 26, 2016 with partial English translation (12 pages).

\* cited by examiner

TRANSMISSION OF A MESSAGE TO BE DISPLAYED TO A DISPLAY DEVICE OF A MOTOR VEHICLE

CROSS REFERENCE TO RELATED APPLICATIONS

This application is a continuation of PCT International Application No. PCT/EP2017/051073, filed Jan. 19, 2017, which claims priority under 35 U.S.C. § 119 from German Patent Application No. 10 2016 201 162.6, filed Jan. 27, 2016, the entire disclosures of which are herein expressly incorporated by reference.

BACKGROUND AND SUMMARY OF THE INVENTION

The invention relates to a method, a processor device, a motor vehicle having such a processor device and a message transmission system for transmitting a message to be displayed to a display device of a motor vehicle.

Motor vehicles often have display devices, which can be used to display many different kinds of information to the driver and/or the passengers in the motor vehicle. This information can come from, e.g., a navigation device, a radio, a CD/DVD player, a modem (internet) or from any other device or system in the motor vehicle.

The information displayed on the display device in modern vehicles is processed, prepared and reproduced on the display device by software modules. These software modules, which are and can be executed on the motor vehicle, typically provide different services. These services can be, for example, system services, network services, telecommunications services, navigation services, media playback services, messaging services and other information, entertainment and assistance services.

The services can either be free or else provided by a service provider on a fee-paying basis. The service providers are often motor vehicle manufacturers, who offer the services to a buyer of a motor vehicle. The buyer can then book such a service if required.

Different motor vehicles from the same manufacturer often have different software versions. While certain services may be provided on a motor vehicle, or the necessary software modules are installed and running there, it may be the case that these software modules are not available on another vehicle. In particular, there are motor vehicles on which no software module for a messaging service is present and running.

This can also be true if the term of the contract of a booked service ends. It is then possible to terminate the software modules which are necessary for a service, or even to uninstall them with their associated components.

In certain situations, it may be advantageous to conduct a communication with the driver and/or the keeper of the motor vehicle. Often, however, there is no communication facility available since information about a buyer, in particular a second or subsequent buyer, is not available to the manufacturer for reasons such as data protection. This means that the manufacturer is denied the opportunity to communicate directly with the buyer. In some countries, it is only possible for the manufacturer to communicate with the buyer via official bodies, or to send messages to the buyer indirectly. This is often possible in the case of e.g. recall actions for repairs or correction of defects in some countries, such as Germany, in these exceptional cases.

The object of the invention is to create a method, a processor device, a motor vehicle having such a processor device and a message transmission system for transmitting a message to be displayed to a display device of a motor vehicle, so that the message can be transmitted to this vehicle at any time and displayed on its display device regardless of the software and/or mobile radio status of the vehicle.

Another object of the invention is to create a method, a processor device, a motor vehicle having such a processor device and a message transmission system for transmitting a message to be displayed to a display device of a motor vehicle, so that keeper-specific or driver-specific information can be obtained and/or acknowledgement of the message can be confirmed.

Another of the objects of the invention is to create a method, a processor device, a motor vehicle having such a processor device and a message transmission system for transmitting a message to be displayed to display devices of a plurality of motor vehicles, so that an available transmission capacity can be used efficiently.

One or more of these objects is achieved by a method or a device in accordance with the independent claims. Advantageous designs of the invention are described in the respective dependent claims.

A method for transmitting a message to be displayed on a display device of a motor vehicle comprises the steps:
  selecting at least one motor vehicle to which a message is to be transmitted, from a motor vehicle database on a central computer on the basis of pre-defined selection criteria and ascertaining a mobile radio system mobile radio identification number which is associated with the respective motor vehicle,
  activating an inactive subscriber identity module of the mobile radio system on the basis of the mobile radio identification number, wherein the subscriber identity module is connected to a radio device of the at least one selected motor vehicle,
  setting up a data connection from the central computer to the radio device of the at least one selected motor vehicle via the mobile radio system,
  transmitting the message to be displayed from the central computer via the data connection to a processor device, connected to the radio device, of the respective ascertained motor vehicle,
  further processing of the message by the processor device, and displaying the message on a display device connected to the processor device.

By selecting at least one motor vehicle to which a message is to be transmitted on the basis of the pre-defined selection criteria, the message can be targeted to one or more specific motor vehicles.

The selection criteria for selecting at least one motor vehicle comprise a vehicle identification number, a motor vehicle type, a motor vehicle model, a motor vehicle key number, year of manufacture, mobile radio status and/or a software status. These criteria can be applied or used individually or in combination to select the motor vehicles.

The transmission of the message is carried out using the radio device of the at least one selected motor vehicle. Such transmission devices are often connected to subscriber identity modules. These subscriber identity modules are necessary in order to be able to set up a communication over a mobile radio system, since the subscriber identity module uniquely identifies the subscriber in the respective mobile radio network. The subscriber identity module is identified on the basis of the mobile radio identification number.

For example, such subscriber identity modules can be designed as a SIM card.

In many cases, such subscriber identity modules are already installed in vehicles at the time of manufacture. Depending on the services booked by the buyer, the corresponding subscriber identity module is either activated or deactivated.

Activating an inactive subscriber identity module creates the possibility of transmitting the message to be displayed to the display device of the respective motor vehicle which is fitted with the subscriber identity module. This means that communication can take place independently of a mobile radio status of the motor vehicle. This enables a direct communication with the driver, who is often identical to the buyer, and/or the occupants of the motor vehicle even if the subscriber identity module is inherently deactivated.

A subscriber identity module is activated via a mobile radio service provider of the associated mobile radio system, by the mobile radio provider configuring the mobile radio system for the mobile radio identification number in such a way that the subscriber identity module is accepted as valid for use in the mobile radio system.

The mobile radio status is understood in the context of the present invention to mean the state in which the mobile radio components of the motor vehicle are in with regard to their ability to communicate.

Before transmitting the message to be displayed the central computer can check via the data connection whether one or more software modules on the processor device are needed for further processing and/or displaying the message. If a required software module is not installed on the processor device, an installation command or the corresponding software module together with the installation command can be transmitted from the central computer via the data connection to the processor device to install the corresponding software module. If a required software module is not running, an execute command can be transmitted from the central computer via the data connection to the processor device to execute the corresponding software module.

By this installation and/or execution of these software modules, the message to be displayed can be transmitted to the motor vehicle at any time and displayed on its display device, regardless of the software status of the vehicle.

In the context of the present invention the software status is understood to mean the state in which the software modules are with regard to their installation state and their current execution state.

The installation state comprises the following states:
installed,
not installed and installable, and
not installed and not installable.

A non-installed and directly installable software module can be stored in a memory device connected to the processor device in the motor vehicle and installed from there. However, if a non-installed and non-installable software module is present, then the central computer can transmit this for installation. A software module transmitted in this way is stored in the storage device as an installable software module and is installed from there by means of the transmitted installation command.

The execution state comprises the following conditions:
executing,
not executing and executable, and
not executing and not executable.

A non-executing and non-executable software module in the context of the present invention is understood to mean a software module for the execution of which certain other software modules are necessary, but are not currently executing and/or not installed.

Since the central computer is informed about the software status of the processor device, it can carry out the required operations in order to change the software status in such a way that the transmission of the message can take place. In other words, the central computer causes all software modules required for displaying the message to be in the installation state "installed", and in the execution state "executing". Only then does it transmit the message to be displayed.

One or more of the software modules which are installed and/or executing on the processor device for further processing of the message and/or displaying the message, can be uninstalled from the processor device by means of an uninstall command transmitted from the central computer and/or terminated on the processor device by means of a termination command transmitted from the central computer.

This allows the previous software status, i.e. the installation state before an installation and the execution state before an execution of software modules, to be restored.

During a de-installation, the software modules to be de-installed can be stored in the memory device so that they can be installed again from it quickly and easily if they are needed again. However, installable software modules can also be deleted from the storage device by the central computer.

After the message has been displayed on the display device the subscriber identity module can be deactivated.

This allows the previous mobile radio status to be restored.

Deactivating a subscriber identity module is performed in a similar way to the activation, via the mobile service provider of the associated mobile radio system.

To transmit the message to be displayed from the central computer, a trigger can be first transmitted to the processor device of the ascertained motor vehicle. The trigger can control the processor device to retrieve the message or a link to the message from the central computer. If in this operation a link to the message is retrieved from the central computer, then the processor device can retrieve the message by following the link.

This ensures that the available transmission capacity and/or the available resources are used efficiently.

In the context of the present invention the available transmission capacity is understood to mean the amount of data that can be transmitted via the mobile radio system per unit time.

Resources in the context of the present invention are hardware resources or system resources of a computer, which are needed for the operation of the computer or for executing computer programs.

A trigger in the context of the present invention is a small message containing the identifier of a recipient of the trigger and a reference to a data source. The reference to a data source can be understood to mean a command for retrieving data from the data source. The trigger can also contain a command for this retrieval, however.

Such a trigger can be transmitted many times, since it only contains a small amount of data. Even if a success rate of data retrieved due to a transmission of the trigger to different motor vehicle is not very high, the cost in terms of data to be transmitted is justifiable. Preferably, the trigger is no greater than 256 bytes or characters.

For a plurality of motor vehicles, the activation and/or deactivation of the subscriber identity module and/or the installation, the execution, the de-installation and/or the termination of the one or more software modules can be carried out by means of a selection among a plurality of motor vehicles.

This means that the previous mobile radio status and/or software status can be restored for a plurality of vehicles at the same time and therefore efficiently.

The selection of a plurality of motor vehicles can be carried out according to the selection criteria described above.

When displaying the message using an input device a user response, in particular a user confirmation or input, can be acquired by the processor device. This user response can be transmitted from the processor device via the data connection to the central computer for storage.

This enables a confirmation of the transmitted message by the user to be recorded and logged on the central computer. This is advantageous when messages are sent for which confirmation has legal importance, for example messages relating to recall actions. In some countries it is possible, for example, to communicate a recall action directly to the respective driver or buyer of the motor vehicle instead of via the authorities or the press, in order to comply with legal requirements.

Furthermore, the option exists to request data input by the user. This can involve requesting personal data, such as name, address, and/or other contact information, such as an e-mail address, phone number, etc. This allows the possibility of contacting the purchaser of the motor vehicle after their purchase, in order to offer additional service and/or after-sales care packages and thus increase customer satisfaction.

A user in the context of the present invention means the driver or one of the occupants of the motor vehicle and preferably the buyer or owner of the same, or a person authorized by them.

According to a further aspect of the present invention, a processor device is provided for transmitting a message to be displayed to a display device of a motor vehicle. In this case the processor device is designed for receiving messages to be displayed and for displaying messages on a display device of the motor vehicle. In order to receive messages to be displayed and to display messages the processor device can be connected to a data bus of the motor vehicle via a data bus interface. The data bus is connected to a radio device to receive messages to be displayed and to a display device for displaying messages. The processor device is designed to execute the method described above.

According to a further aspect of the present invention a motor vehicle is provided, which comprises such a processor device.

According to a further aspect of the present invention, a message transmission system is provided, which comprises such a motor vehicle.

In addition, the message transmission system can comprise a central computer for transmitting a message to be displayed to the display device of the motor vehicle and an operating computer for operating the central computer.

The central computer can be used to control the message transmission system centrally, wherein all control data can be accessed centrally on the central computer.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
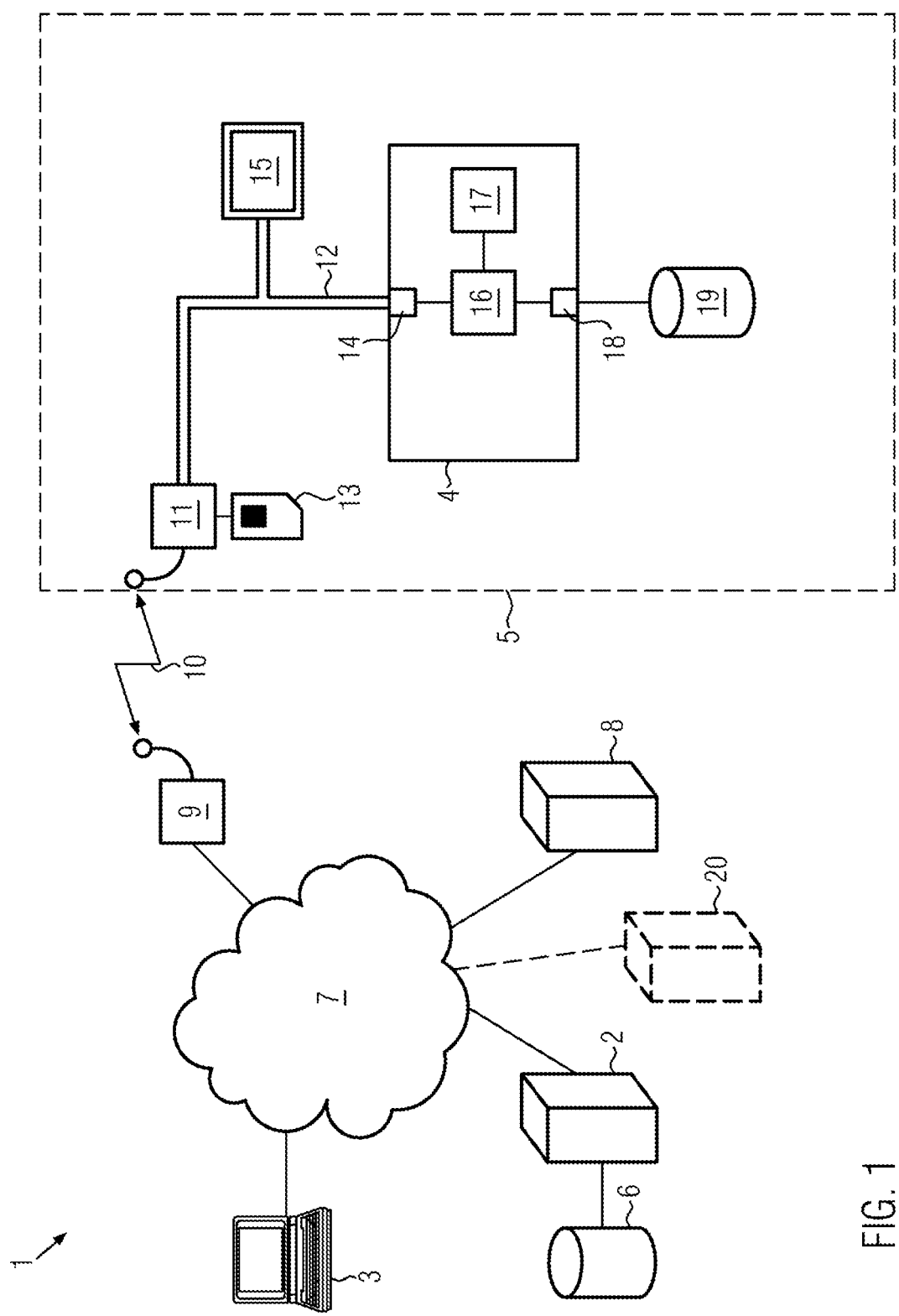
FIG. 1 illustrates schematically an exemplary message transmission system for transmitting a message to be displayed to a display device of a motor vehicle.

In the following an exemplary embodiment of a message transmission system 1 for transmitting a message to be displayed to a display device of a motor vehicle (FIG. 1) is described.

The message transmission system 1 comprises a central computer 2, an operating computer 3, a processor device 4 of a motor vehicle 5 and the motor vehicle 5 with the processor device 4.

The central computer 2 is connected to a storage device 6 for storing data that are related to the execution of the method for transmitting a message to be displayed to a display device of a motor vehicle. These data comprise software modules, installation information, identification descriptors for identifying a person, logs of user responses or user input data, authentication data, authorization data and/or data communication connection data and vehicle-specific parameters. The vehicle-specific parameters can be stored in a motor vehicle database.

The vehicle-specific parameters comprise parameters that are specified, pre-defined and/or assigned to the motor vehicle 5 during the manufacture of the motor vehicle 5. These parameters are, for example, a vehicle identification number, such as a chassis number for vehicle identification, a motor vehicle model or motor vehicle key number, a model name, communication connection data for the communication with the motor vehicle 5, identification and/or version numbers of devices, systems, equipment, software modules, etc. present on the motor vehicle.

The stored communication connection data comprise all of the data necessary for communication with a computer 2, 3 or the motor vehicle 5, such as IP addresses, mobile radio data, mobile radio provider data, radio equipment data and subscriber identity module data.

The central computer 2 is connected to an external data network 7. This data network 7 can be a local data network (LAN) or a wide area network (WAN), such as the internet.

The operating computer 3 is also connected to the data network 7, so that it can communicate with the central computer 2. The operating computer 3 is used to operate the central computer 2, wherein on the operating computer 3 a login procedure is preferably provided for logging in an operator of the operating computer 3 on the central computer 2 with different roles and rights.

Also, a mobile radio provider computer 8 is connected to the data network 7 and can communicate with the central computer 2 via the data network 7. The mobile service provider computer 8 is a computer system of a mobile radio provider of a mobile radio system, which the central computer 2 can access to activate and deactivate subscriber identity modules. An authentication process can preferably be carried out so that only one authorized central computer 2 can communicate with the mobile radio provider computer 8.

A stationary radio device 9 is also connected to the data network 7, so that the central computer 2 and stationary radio device 9 can communicate with each other.

The stationary radio device 9 is connected by means of a radio connection 10 to a radio device 11, which is arranged in the motor vehicle 5. The radio device 11 in the motor vehicle 5 is connected to a data bus 12 and designed, for example, for the transmission of data in a mobile radio system. The mobile radio system can be a system based on a mobile radio standard, such as GSM, UMTS, LTE, 4G or 5G. If the radio device 11 is designed according to such a mobile radio standard, then it has a radio device identification number, which is known as an IMEI (International Mobile Station Equipment Identity). The radio device identification number is included in the radio device data.

The radio device 11 is connected to a subscriber identity module 13, which has a mobile radio identification number and a mobile telephone number. The mobile identification number is used to uniquely identify the subscriber identity module 13 and address it via the mobile telephone number. In the case of a subscriber identity module 13 which is designed as a SIM card, the mobile radio identification number is referred to as an ICC-ID (Integrated Circuit Card Identification Number) and the mobile telephone number as an MSISDN (Mobile Subscriber Integrated Services Digital Network Number or else Mobile Station Integrated Services Digital Network Number). The mobile phone number and the mobile radio identification number are included in the subscriber identity module data.

Since the particular vehicle 5 is uniquely identifiable in the motor vehicle database via the vehicle identification number, it is possible via this to access the radio device identification number, the mobile radio identification number and the mobile telephone number of the motor vehicle 5. If the radio device 11 is replaced by another radio device 11 and/or the subscriber identity module 13 is replaced by another subscriber identity module 13 in the motor vehicle 5, e.g. due to a repair or a refit, then the radio device identification number, the mobile radio identification number and/or the mobile telephone number are updated in the motor vehicle database.

The processor device 4 has a data bus interface 14. Via the data bus interface 14 the processor device 4 is connected to the data bus 12, so that ultimately central computer 2 and processor device 4 can communicate with each other via the above-mentioned components.

The data bus 12 connects additional devices or equipment of the motor vehicle 5 to each other and to the processor device 4. Via the data bus 12, these devices and equipment of the motor vehicle 5 can communicate with each other and with the processor device 4.

A display device 15 for displaying messages, in particular messages to be transmitted according to the invention, is connected to the data bus 12. The display device 15 can also be used to display other types of content or information, such as navigation maps, driving directions, internet content, music playlists, multimedia content, etc.

Other components of the processor device 4 are described in the following.

Also connected to the data bus interface 14 is a microprocessor 16, which controls the processor device 4. The microprocessor 16 can communicate with the data bus 12 via the data bus interface 14.

The microprocessor 16 is also connected to an internal memory 17. This Internal memory 17 is used for storing programs that can be executed by the microprocessor 16 and are executed during the operation of the processor device 4, such as a web browser, a messaging application, a Short Message Service, as well as additional data during the operation of the processor device 4.

The microprocessor 16 is also connected to a storage device interface 18, to which an external storage device 19 is connected. Via the storage device interface 18, the microprocessor 16 can write data to the external storage device 19 or read data from it. The purpose of this is to enable the use of the cheapest possible storage media for storing data, in particular if large quantities of data are stored on installable software modules. The external storage device 19 is preferably embodied as a non-volatile memory, so that the data is not lost even if the device is switched off or if the power supply fails. The external storage device is a disk drive, for example, which has flash memory 19 for storage.

The internal memory 17 and/or the external storage device 19 can be used to store vehicle-specific parameters, communication connection data, authentication data, messages to be displayed, user responses, installable software modules and/or installed software modules.

Figure 2:
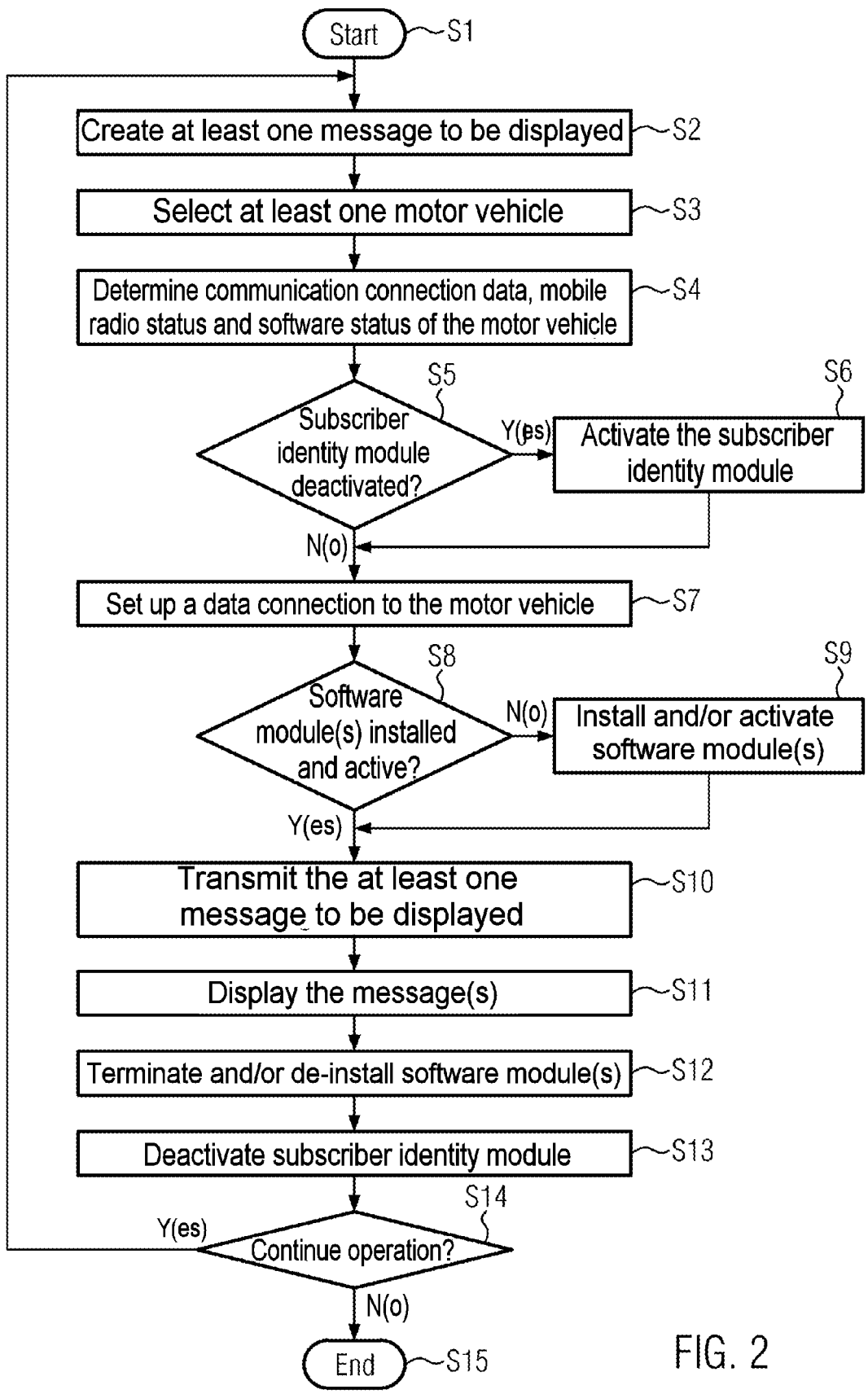
FIG. 2 is a flow chart illustrating an exemplary method for transmitting a message to be displayed to a display device of a motor vehicle.

In the following an exemplary embodiment for transmitting a message to be displayed to a display device of a motor vehicle is described (FIG. 2). This method can be implemented with the message transmission system 1 outlined above.

The process starts at step S1.

In step S2 at least one message to be displayed on at least one motor vehicle 5 is created by an operator on the operating computer 3. Creating a message also comprises the loading of a previously created message from a storage medium (not shown), from the central computer 2 or from another computer system (not shown), which is connected to the data network 7. Preferably, the loading of a message from the central computer 2 requires a prior login procedure by the operator on the central computer 2 with a successful authentication.

The operator then selects at least one motor vehicle 5 to which the message is to be transmitted (step S3). To this end the operator preferably performs a login on the central computer 2 if he/she has not already done so. The operator selects the at least one motor vehicle 5, wherein for the selection he/she enters at least one appropriate selection criterion or a range or a combination of selection criteria. A plurality of motor vehicles 5 can also be selected, to which the same message is then ultimately transmitted later in the processing sequence.

On the basis of the selection criteria entered, the central computer 2 ascertains from the motor vehicle database stored in the storage device 6 the corresponding communication connection data for the communication with the respective motor vehicle 5, along with its mobile radio and software status (step S4). The communication connection data includes a mobile radio identification number which is assigned to the corresponding subscriber identity module 13, which is connected to the radio device 11 of the particular motor vehicle 5. The communication connection data can also include a mobile telephone number, provided the subscriber identity module 13 has been activated at least once before execution of the method and/or the mobile telephone number is stored in the motor vehicle database. The mobile radio status indicates whether or not the subscriber identity module 13 is activated, while the software status indicates the software modules installed in the motor vehicle 5 and their execution state.

The central computer 2 then checks whether or not the subscriber identity module 13 of the respective motor vehicle 5 is deactivated (step S5). It can carry out this check on the basis of the previously determined mobile radio status.

If the subscriber identity module 13 is deactivated, then the method sequence is continued with the execution of step S6, in which the subscriber identity module 13 is activated. This activation is carried out by the central computer 2 by transmitting an activation message to the mobile radio provider 8 containing the mobile identification number associated with the subscriber identity module 13. This preferably involves an authentication of the central computer 2 with the mobile radio provider 8, so that only an authorized central computer 2 can transmit activation messages.

In the case of a subscriber identity module 13 which has not yet been activated, which is now activated for the first time, it may be the case that no mobile telephone number has yet been assigned to this subscriber identity module 13 or stored in the motor vehicle database. A new mobile telephone number is then assigned by the mobile radio provider computer 8 to the subscriber identity module 13 after receiving the activation message. The mobile radio provider computer 8 transmits this assigned mobile telephone number to the central computer 2 in response to the activation message. The central computer 2 can then store the mobile telephone number that it received in the motor vehicle database, linked to the vehicle identification number.

A data connection to the motor vehicle 5 is then set up by the central computer 2 via the radio connection 10, using the mobile telephone number assigned to its subscriber identity module 13 (step S7).

In the following step S8 the central computer 2 checks the software status of the motor vehicle 5. In other words, it is checked whether the software modules required for the transmission of the message are installed and running on the processor device 4.

If not all the necessary software modules are installed and running, the method sequence is continued with the execution of step S9, in which the central computer 2 installs the necessary software modules on the processor device 4 by means of an installation message and/or executes them there by means of an execution message. As part of this process the central computer 2 firstly checks, for each software module which is not installed, whether the particular software module is stored in the internal memory 17 or in the external storage device 19 as an installable software module, for example as a software package. If the particular non-installed software module is not stored there, the central computer 2 then transmits the software module via the data connection to the processor device 4, which caches the transmitted software module as an installable software module in the internal memory 17 or in the external storage device 19. If the non-installed software module is stored or cached as an installable software module, then an installation message is transmitted to the processor device 4 by the central computer 2 to install the non-installed software module. In this case an installation is carried out in the internal memory 17 or in a specific area of the external storage device 19, which acts as an extended program memory of the processor device 4. After all the necessary software modules are installed, a check is made to ascertain whether the processor device 4 is executing them all. In order to execute software modules that are not running, the central computer 2 transmits a corresponding execution message for each of these software modules. The execution messages for different software modules can also be transmitted together in one execution message to keep the impact on the transmission capacity of the mobile radio system to a minimum. After receiving an execution message, the processor device 4 initializes the respective software module and executes it, so that all the necessary software modules are executing.

The central computer 2 then transmits the at least one message to be displayed to the processor device 4 (step S10). The message transmission takes place in such a way that a trigger is first transmitted to the processor device 4 from the central computer 2. The trigger activates the processor device 4 to retrieve the message or a link to the message from the central computer 2. If in this operation a link to the message is transmitted from the central computer 2, then the processor device 4 retrieves the message by following this link, so that the central computer 2 transmits the message. In this process, a plurality of messages to be displayed can also be transmitted one after another.

The trigger, the link and/or the message can be transmitted, for example, via SMS (Short Message Service) to the mobile telephone number of the subscriber identity module and/or via network access to an IP address (Internet Protocol) of the radio device 11. The network access can be provided by a program executed on the processor device 4.

The message or messages to be displayed are then displayed by the processor device 4 on the display device 15, by the processor device 4 transmitting them via the data bus 12 to the display device 15 (step S11).

After the display operation has been carried out, in step S9 the central computer 2 terminates the software modules previously executed in step S9 and/or de-installs the software modules previously installed in step S9 (step S12). This is achieved in a similar way to the installation or execution of the software modules, namely by transmitting a termination message and/or a de-installation message from the central computer 2 to the processor device 4. Installable software modules that are cached in the internal memory 17 or in the external storage device 19 can remain stored for future use during a re-installation. These can also be deleted upon a delete message from the central processor 2.

The central computer 2 then deactivates a subscriber identity module 13 that was previously activated in step S6 (step S13). This is effected in a similar way to that in which it was activated in step S6, namely by the central computer 2 transmitting a deactivation message to the mobile radio provider computer 8 containing the mobile radio identification number associated with the subscriber identity module 13. This preferably involves an authentication of the central computer 2 with the mobile radio provider 8, so that only an authorized central computer 2 can transmit activation messages.

The method sequence is then continued with the execution of step S14, in which it is determined whether the operation is to be continued.

If the operation is to be continued, then step S2 is executed again. Otherwise the method ends in step S15.

If in step S5 the central computer 2 detects that the respective subscriber identity module is not deactivated, then the method sequence is continued directly with the execution of step S7.

If in step S8 the central computer 2 detects that all necessary software modules are installed and executing on the processor device 4, then the method sequence is continued directly with the execution of step S10.

Alternative embodiments of the message transmission system 1 are described in the following.

The processor device 4 in the exemplary embodiment is shown as a control system independent of other components of the motor vehicle 5 that are not described. However, it can also be identical to a central control system 5 of the motor vehicle, which may also perform other functions. This means that a central control system, which is already provided in modern motor vehicles 5, can be used for the transmission of the messages. However, this places a load on the computational power and the available resources of the central control system.

A plurality of mobile radio provider computers 8 from different mobile radio providers and/or a plurality of stationary radio devices 9 of these different mobile radio providers can be connected to the data network 7. If a plurality of mobile radio provider computers 8 from different mobile radio providers are present, then each of these different mobile radio providers can be assigned at least one stationary radio device 9, which can only be used by this mobile radio provider.

If a plurality of stationary radio devices 9 from different mobile radio providers are present, then these stationary radio devices 9 can be operated in different mobile radio systems, in different frequency ranges and/or with different multiplexing and/or encoding methods.

The subscriber identity module 13 can also be designed such that a specific mobile radio provider can be assigned to it at any time in a flexible manner. This means that the subscriber identity module 13 can be configured by means of a subscriber identity module configuration message in order to communicate via one of a set of different mobile radio providers. A first mobile telephone provider is then assigned to the subscriber identity module 13 before it is installed in the radio device 11, or before the radio device 11 with the subscriber identity module 13 is installed in the motor vehicle 5. If the subscriber identity module 13 is designed in the form of a SIM card, then such a SIM card is referred to as a White-Label SIM and the subscriber identity module configuration message is designated a SIM subscription.

As an alternative to the implementation of the display device 15 as a touch-sensitive screen, the display device 15 can also be implemented as a non-touch-sensitive device. In this case an input device (not shown) is provided, which can preferably be connected to the data bus 12 and which allows the user responses to be recorded. The input device can be implemented as a keyboard, keys, a camera, preferably with gesture control, etc.

Such an input device can also be provided in addition to the display device 15, which is implemented as a touch-sensitive screen.

The external storage device 19 can also be omitted. In this case, the storage device interface 18 may also be omitted. All data necessary for the operation of the processor device 4 can then be stored in the internal memory 17. The internal memory 17 is then preferably embodied as a non-volatile memory, so that the data is not lost even if the device is switched off or if the power supply fails.

The function of the transmission of a message can alternatively or additionally be performed completely or partially by a specific message processor 20, which is shown in FIG. 1 by dashed lines. The central computer 2 then either does not perform this function of transmitting a message at all, or only partially. The message processor 20 is connected to the data network 7, and the central computer 2 can communicate with it. The message processor 20 can transmit the message, or transmit the link to the message and/or the trigger. The central computer 2 then only performs the functions that are not performed by the message processor 20. Preferably, the message processor 20 transmits at least the message. The use of the message processor 20 saves the resources of the central computer 2, in particular when transmitting large numbers and/or large messages.

The following contains a description of alternative embodiments of the method described above for transmitting a message to be displayed to a display device of the motor vehicle.

The execution sequence of steps S2 and S3 can be reversed.

The execution sequence of steps S2 to S4 can be changed as follows: S3, S4, S2.

If a plurality of mobile radio provider computers 8 from different mobile radio providers is present, then in step S4 by checking the motor vehicle database, the central computer 2 determines which of these mobile radio provider computers 8 can be used to activate the subscriber identity module 13. If step S6 is executed, then the central computer 2 transmits the activation message to the mobile radio provider computer 8 determined in step S4.

If the central computer 2 determines in step S4 that the subscriber identity module 13 is designed such that it can be assigned a mobile radio provider in a flexible way, then the computer 2 first determines which mobile radio provider is currently assigned to the subscriber identity module 13. This is necessary it is only possible to communicate with the subscriber identity module 13 via this mobile radio provider. Then the central computer 2 can determine, e.g. on the basis of a list of possible mobile radio providers, whether it might be advantageous to assign another mobile radio provider to the subscriber identity module 13. Using a different mobile radio provider may offer such advantages as a more efficient use of the transmission capacity and/or a more efficient, faster and/or more cost-effective data transmission.

If in step S4 the central computer 2 identifies another or a new mobile radio provider to be assigned to the subscriber identity module 13, then in step S6, using the mobile radio provider computer 8 of the currently assigned mobile radio provider, it can first transmit a subscriber identity module configuration message to the subscriber identity module 13 to assign the other or the new mobile service provider. The central computer 2 then activates the subscriber identity module 13 via the mobile radio provider computer 8 of the newly assigned mobile radio provider, as explained above (step S6).

In step S10, a message can also be transmitted directly. This means that the message is transmitted without the prior transmission of a trigger or link from the central computer 2 to the processor device 4.

If a message processor 20 is present, then in step S10 the central computer 2 can transmit the trigger, link to be transmitted and/or the message to be transmitted together with the corresponding communication connection data to the message processor 20. The message processor 20 then transmits the trigger, link and/or the message to the appropriate motor vehicle 5.

In step S11, after a message is displayed one or more user responses can be recorded by the processor device 4, such as a user confirmation or user input. This user response or these user responses can then be transmitted by the processor device 4 to the central computer 2 and cached in the internal memory 17 or in the external storage device 19 for later use and/or transmission. This allows owner- or driver-specific information to be acquired if the driver or occupant of the motor vehicle is prompted by means of the message to be displayed to enter such information, such as personal data, and then does so. Also, acknowledgement of the message displayed can be confirmed by the driver or occupant of the motor vehicle if he/she is prompted for confirmation by means of the displayed message and performs this by, for example, pressing a key on the input device.

The execution of the steps S12 and/or S13 can be omitted or these steps can be skipped if no termination, de-installation, delete and/or deactivation of software modules on the processor device 4 is required to take place.

REFERENCE NUMERALS 1 message transmission system
2 central computer
3 operating computer
4 processing device
5 motor vehicle
6 memory device
7 data network
8 mobile radio provider computer
9 stationary radio device
10 mobile radio connection
11 radio device
12 data bus
13 subscriber identity module
14 data bus interface
15 display device
16 microprocessor
17 internal memory
18 storage device interface
19 external storage device
20 message processor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for transmitting a message to be displayed to a display device of a motor vehicle, the method comprising:
    selecting the motor vehicle to which the message is to be transmitted, from a database on a central computer remote from the motor vehicle, based on pre-defined selection criteria;
    ascertaining a mobile radio identification number of a radio device of the motor vehicle from the database;
    remotely activating, via a radio link, an inactive subscriber identity module connected to the radio device, based on the ascertained mobile radio identification number, wherein the subscriber identity module has an associated subscriber identity module identification number;
    setting up a data connection of the radio link from the central computer to the radio device of the motor vehicle, wherein the central computer sets up the data connection with the associated subscriber identity module identification number;
    transmitting the message to be displayed from the central computer via the data connection to a processor device, connected to the radio device, of the motor vehicle; and
    further processing of the message by the processor device, and displaying the message on a display device connected to the processor device.

2. The method as claimed in claim 1, wherein before transmitting the message to be displayed via the data connection, the central computer checks whether one or more software modules on the processor device are required for the further processing and/or the display of the message and, if a required software module is not installed on the processor device, transmitting an installation command or the corresponding software module together with the installation command from the central computer via the data connection to the processor device for the installation of the corresponding software module, and/or if a required software module is not running, transmitting an execute command from the central computer via the data connection to the processor device to execute the corresponding software module.

3. The method as claimed in claim 2, wherein the one or more of the software modules, which are installed and/or executed on the processor device for further processing of the message and/or displaying the message, are de-installed from the processor device via an uninstall command transmitted from the central computer and/or terminated on the processor device via a termination command transmitted from the central computer.

4. The method as claimed in claim 1, wherein after displaying the message on the display device, the subscriber identity module is deactivated.

5. The method as claimed in claim 1, wherein to transmit the message to be displayed from the central computer, a trigger is first transmitted to the processor device of the identified motor vehicle, wherein the trigger activates the processor device to retrieve the message or a link to the message from the central computer, and if a link to the message is retrieved from the central computer then the processor device retrieves the message from the central computer by following the link.

6. The method as claimed in claim 1, wherein for a plurality of motor vehicles, the activation and/or deactivation of the subscriber identity module and/or the installation, the execution, the deinstallation, and/or the termination of the one or more software modules, is carried out by way of a selection among a plurality of motor vehicles.

7. The method as claimed in claim 1, wherein when displaying the message, by use of an input device a user response is recordable by the processor device and said user response is transmitted from the processor device via the data connection to the central computer for storage.

8. The method as claim in claim 7, wherein the user response is a user confirmation or input.

9. The method as claimed in claim 1, wherein the subscriber identity module is designed as a SIM card.

10. A processor device for transmitting a message to be displayed to a display device of a motor vehicle, the motor vehicle including: a processor operatively configured to receive messages to be displayed and to display messages on a display device of the motor vehicle, wherein the processor is connectable to a data bus of the motor vehicle via a data bus interface in order to receive messages to be displayed and to display messages, the data bus is connected to a radio device to receive messages to be displayed and to the display device for displaying messages, wherein the processor device is configured to execute a method comprising:
    selecting the motor vehicle to which the message is to be transmitted, from a database on a central computer remote from the motor vehicle, based on pre-defined selection criteria;
    ascertaining a mobile radio identification number of the radio device of the motor vehicle from the database;
    remotely activating, via a radio link, an inactive subscriber identity module connected to the radio device, based on o the ascertained mobile radio identification number, wherein the subscriber identity module has an associated subscriber identity module identification number;

setting up a data connection of the radio link from the central computer to the radio device of the motor vehicle, wherein the central computer sets up the data connection with the associated subscriber identity module identification number;

transmitting the message to be displayed from the central computer via the data connection to a processor device, connected to the radio device, of the motor vehicle; and further processing of the message by the processor device, and displaying the message on a display device connected to the processor device.

11. A motor vehicle comprising a processor device as claimed in claim 10.

12. A message transmission system, comprising a motor vehicle as claimed in claim 11.

13. The message transmission system as claimed in claim 12, wherein the message transmission system comprises a central computer for transmitting a message to be displayed to the display device of the motor vehicle, and an operating computer for operating the central computer.

* * * * *